United States Patent
Yokoyama

[11] Patent Number: 5,999,218
[45] Date of Patent: Dec. 7, 1999

[54] ADAPTIVE QUANTIZATION CONTROLLER

[75] Inventor: Yutaka Yokoyama, Tokyo, Japan

[73] Assignee: NEC Corporation, Japan

[21] Appl. No.: 08/915,253

[22] Filed: Aug. 20, 1997

[30] Foreign Application Priority Data

Aug. 22, 1996 [JP] Japan .................................. 8-221233

[51] Int. Cl.⁶ .............................. H04N 7/30; H04N 7/32
[52] U.S. Cl. ......................... 348/405; 348/419; 382/251;
375/245; 341/200
[58] Field of Search .................................. 348/405–406,
348/419, 414, 417–418, 422, 420; 341/200;
382/251–253; 375/245, 243; H04N 7/32,
7/30

[56] References Cited

U.S. PATENT DOCUMENTS

| 4,736,387 | 4/1988 | Tzou ...................................... 375/245 |
| 5,396,291 | 3/1995 | Sanpei ................................... 348/405 |
| 5,568,514 | 10/1996 | McCree et al. ........................ 348/405 |
| 5,587,708 | 12/1996 | Chin ....................................... 341/200 |
| 5,663,763 | 9/1997 | Yagasaki et al. ..................... 348/405 |
| 5,712,874 | 1/1998 | Okamoto ............................... 375/243 |
| 5,724,097 | 3/1998 | Hibi et al. ............................. 348/405 |
| 5,745,179 | 4/1998 | Senda ..................................... 348/405 |

FOREIGN PATENT DOCUMENTS 5-137132  6/1993  Japan .

*Primary Examiner*—Vu Le
*Attorney, Agent, or Firm*—Ostrolenk, Faber, Gerb & Soffen, LLP

[57] ABSTRACT

An adder 101 computes the difference between the activity (act) of an objective block and the average value (avg(act)) of activities all over the previous frame. A shifter 102 shifts the difference by a specified bits (n). Finally, an adder 103 adds output of the shifter 102 to a reference quantizing step (Qj) determined by a code quantity control and outputs the added result as a quantizing step Mquant of the objective block.

3 Claims, 2 Drawing Sheets

ADAPTIVE QUANTIZATION CONTROLLER

BACKGROUND OF THE INVENTION

The present invention relates to an adaptive quantization controller used in coding a moving picture, and particularly to an adaptive quantization controller which divides a frame into plural blocks, performs a coding process including a quantization process on each block, and determines a quantizing step to be used in the quantization adaptively according to a property of an image signal in a block.

In a moving picture coding technique, it is widely known to perform an adaptive quantization process which divides a frame into plural blocks and changes a quantizing step according to a characteristic value of an image signal in a block when performing a quantization process on an image signal in a block or on an orthogonally transformed in-block image signal. Generally, such a technique uses the variance of luminance in a block as the characteristic value, takes a large quantizing step in a block having a large luminance variance, and takes a small quantizing step in a block having a small luminance variance. This technique utilizes such a visual characteristic (masking effect) that noises are difficult to detect in an area of complicated texture. This control method aims at improving a subjective image quality and sometimes deteriorates a signal-to-noise ratio (S/N ratio) which is an objective evaluation scale.

As one of such conventional adaptive quantization techniques, there is a method described, for example, in ISO-IEC/JTC1/SC29/WG11/NO.400 Test Model 5. This is an encoder model used in a standardizing work of ISO/IEC 13818-2 (MPEG2 Video). In a method described in the above reference document, as represented by the following expression, a quantizing step (Mquant) for each block is determined by modifying a reference quantizing step (Qj) determined on the basis of a bit-rate control by means of a characteristic value (activity: act) obtained from an image.

$$\text{Mquant} = Qj \times \{2 \times \text{act} + \text{avg(act)}\} \div \{\text{act} + 2 \times \text{avg(act)}\} \quad (1)$$

Here, activity (act) is defined as a luminance variance of pixels in a block. And avg(act) is the average value of activities (act) in the previous frame.

According to this, a large quantizing step Mquant is taken in an area having a large activity (act) and a small quantizing step Mquant is taken in an area having a small activity (act). Depending upon the activity (act), this expression varies the reference quantizing step size (Qj) within a range of 0.5 to 2 times.

Hereupon, since computation of said expression (1) includes many operations of multiplication and division, its processing circuit becomes more complicated. That is to say, a multiplier and a reciprocal number table are needed or the control becomes complicated in performing multiplication and division by means of repetition of addition and subtraction.

FIG. 5 shows a configuration example of such conventional adaptive quantization controllers. In FIG. 5, first, an adder 501 computes the sum of the activity (act) of an objective block and twice the average value of the activities all over one frame (2×avg(act)). The doubling operation can be realized by shifting each bit position. And an adder 502 computes the sum of twice the activity (2×act) and the average value of the activities all over the previous frame (avg(act)). Next, a reciprocal converter 503 outputs the inverse number of the output of the adder 501. A multiplier 504 computes and outputs the product of the output of the adder 502 and the output of said reciprocal converter 503.

And then a multiplier 505 computes the product of the output of said multiplier 504 and a specified reference quantizing step Qj, and outputs the quantizing step Mquant of the objective block. As described above, since this configuration needs multipliers, a reciprocal conversion table and the like, its circuit becomes large in scale.

As another method for computing a quantizing step different from this method, there is a method described in Japanese laid-open publication Tokkaihei No.5-137132. This technique classifies blocks into categories according to activity (act) values or other characteristic quantities (error activity and the like) and determines a quantizing step Mquant corresponding to its category, and thus dispenses with the use of multiplication and division.

FIG. 6 shows a configuration example of an adaptive quantization controllers described in this reference document. First, a category determining circuit 601 classifies blocks into five categories on the basis of activity values or other characteristic values (error activity and the like) of an image. Next, a quantizing step converting circuit 602 converts an obtained category number and a reference quantizing step determined from a bit-rate control into a quantizing step Mquant of each block to be used in an actual quantization process. This technique needs a circuit for performing category classification, a circuit for determining a quantizing step Mquant on the basis of the category and a reference quantizing step Qj. Therefore, this technique cannot sufficiently reduce its circuit size.

SUMMARY OF THE INVENTION

An object of the invention is to realize an adaptive quantization control method by means of a simpler circuit to suppress deterioration of its adaptive quantization process in performance, and to provide an adaptive quantization controller which can reduce the size and complexity of the circuit.

An adaptive quantization controller of the present invention is an adaptive quantization controller which divides a frame into plural small areas and determines a quantizing step size to be used in a quantization process on each divided area adaptively according to a property of the signals in a small area when coding an image by means of a coding process including a quantization process on each divided area, said adaptive quantization controller comprising means for measuring a characteristic value in each divided area, means for computing the difference between the average value of the characteristic quantities in the previously processed frame and the characteristic value of each divided area, means for bit-shifting the difference value by a specified quantity in a specified direction, and means for adding a bit-shifted result to a given reference quantizing step and outputting the added result as a quantizing step to be used in the quantization process on the divided area.

The bit-shift quantity and the shifting direction of the difference value may be set on the basis of a characteristic value of each divided area or a given reference quantizing step value.

According to the invention, a quantizing step (Mquant) is computed by an expression (2).

$$\text{Mquant} = Qj + \{(\text{act} - \text{avg(act)}) \times 2^n\} \quad (2)$$

That is to say, a quantizing step (Mquant) is obtained by adding or subtracting the difference from the average value of activities (act) to or from the reference quantizing step Qj. And the difference can be changed by means of the n-th power of 2, and the degree of control can be adjusted.

According to the above-mentioned configuration, since the quantizing step is increased in a block larger in activity (act) than the average value and the quantizing step is decreased in a block smaller in activity (act) than the average value, a control utilizing the above-mentioned masking effect can be realized. And since the control can be realized by only a small number of adding and subtracting operations and shifting operations, its necessary circuit size is small, and an amount of required operations is less than the above-mentioned two former techniques even when performing these operations by means of a microprocessor.

Hereupon, when transforming the expression (1), $$\text{Mquant}=Qj+\{\text{act}-\text{avg}(\text{act})\}\times Qj \div \{\text{act}+2\times\text{avg}(\text{act})\} \quad (3)$$

is obtained. Accordingly, by changing a shift value n according to a reference quantizing step (Qj) or an activity (act) value for each block, it is possible to realize a performance equivalent to conventional examples of the prior art by means of a simpler configuration than these conventional examples.

DETAILED DESCRIPTION OF THE PREFERRED EMBODIMENTS

The preferred embodiments of the invention are described in the following with reference to the drawings.

Figure 1:
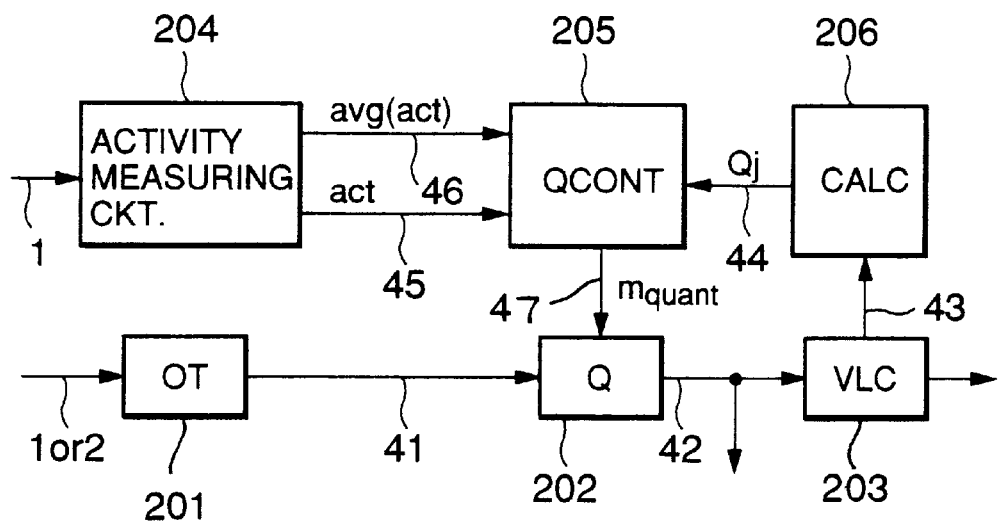
FIG. 1 is a block diagram showing a configuration example of an image coding apparatus provided with an adaptive quantization controller of the invention.

FIG. 1 is a block diagram showing a configuration example of an image coding apparatus provided with an adaptive quantization controller of the invention. First, an input image or an input image to which an interframe-difference operation is applied is divided into blocks of 8×8 pixels or so and supplied to a transform encoder. And the transform encoder 201 applies an orthogonal transformation such as a discrete cosine transformation (DCT) to each block, and computes and outputs transformation coefficients 41. Thereupon, when coding a moving picture, an input image itself is treated as an objective of transform coding when intra-frame coding a moving picture is selected and an interframe prediction error is treated as an objective of transform-coding when performing an interframe prediction.

Next, a transformation coefficient quantizer 202 quantizes transformation coefficients on the basis of a quantizing step 47 determined by an adaptive quantization controller 205 and outputs quantized transformation coefficients 42. Each of the quantized transformation coefficients is converted into a variable-length code in a variable-length coder 203.

A reference quantizing step calculator 206 determines a reference quantizing step 44 (Qj) on the basis of a predetermined target bit-rate and a generated code amount 43 outputted from the variable-length coder 203. An activity measurer 204 measures an activity (act) 45 at an objective block position of the input image.

An activity can be computed by means of the following expression;

$$act = (1/64)\sum_{k=1}^{64}(P_k - \overline{P})^2$$

or $$act = (1/64)\sum_{k=1}^{64}|P_k - \overline{P}|,$$

where $\overline{P} = (1/64)\sum_{k=1}^{64} P_k$ $P_k$: luminance of pixel(k)

Hereupon, when processing each macroblock of 16× 16 pixels which is composed of four blocks, an activity (act) value may be defined as the minimum value of subblock values.

Additionally the activity measurer 204 computes also the average activity 46 (avg(act)) which is the average value of activities (act) all over one frame. That is to say, it sums up all activity (act) values in one frame and divides the sum of the activities (act) by the number of blocks in one frame at the end of the frame. On the assumption that the property of a frame is not suddenly changed, the average value is used in the adaptive control of a frame to be next processed. Here, the initial value is determined in advance.

An adaptive quantization controller 205 computes a quantizing step 47 (Mquant) for each block on the basis of a reference quantizing step (Qj) and an activity (act) value of an objective block by means of the expression (2).

Figure 2:
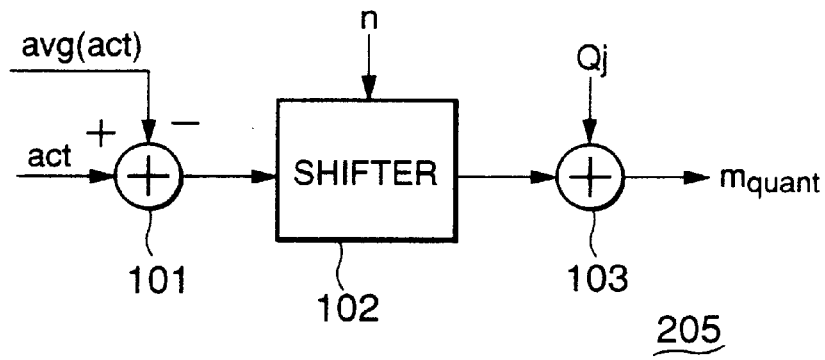
FIG. 2 is a block diagram showing a first embodiment of an adaptive quantization controller of the invention.

FIG. 2 is a block diagram showing a first embodiment of an adaptive quantization controller of the invention.

First, an adder 101 computes the difference between the activity (act) of an objective block and the average value of activities (avg(act)) all over the previous frame. Next, a shifter 102 shifts this difference by a specified number of bits (n). Its shifting direction is determined by the sign of n. Finally, an adder 103 adds a difference value obtained after the shifting operation which is output from the shifter 102 to a reference quantizing step (Qj) determined by the reference quantizing step calculator 206, and outputs the added result as a quantizing step (Mquant) of the objective block. In such a way, this embodiment can perform computation of a quantizing step by two additions and subtractions and one shifting operation. And this embodiment can adjust the degree of the quantizing step control by adjusting the number of bits (n) to be shifted.

Figure 3:
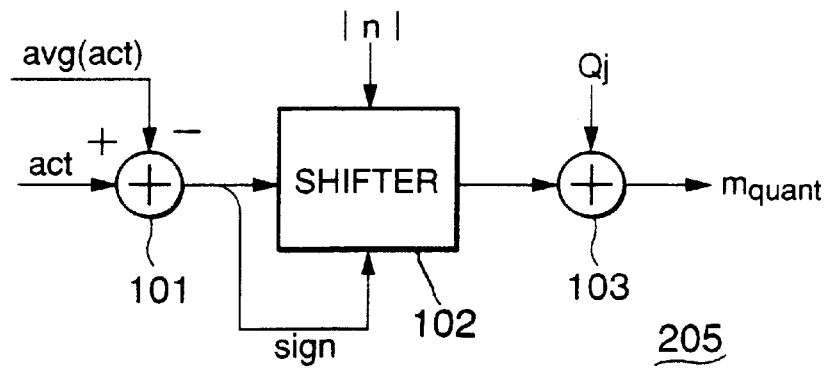
FIG. 3 is a block diagram showing a second embodiment of an adaptive quantization controller of the invention.

FIG. 3 is a block diagram showing a second embodiment of an adaptive quantization controller of the invention. This embodiment determines the shift quantity n on the basis of the activity (act) of an objective block. This embodiment computes the n by means of the following expression;

$$n=1, \text{ if } \{\text{act}-\text{avg}(\text{act})\} \leq 0,$$
$$n=-1, \text{ if}\{\text{act}-\text{avg}(\text{act})\}>0. \quad (7)$$

This changes the weighting by means of the sign of the difference, since an acceptable range of variation of a quantizing step size is small when the activity (act) is large.

In FIG. 3, an adder 101 computes the difference between the activity (act) of an objective block and the average value of activities (avg(act)) all over a frame. The sign bit of the output of this difference is taken out and is connected to the input terminal of a shifter 102 for determining a shifting direction. Hereupon, it is determined that a left shift is performed in case the computation result of the adder 101 is negative, and a right shift is performed in case the computation result of the adder 101 is positive. The shifter 102 shifts the difference by a specified number of bits ($|n|=1$). Finally, the adder 103 adds the difference value which is output from the shifter 102 to a reference quantizing step (Qj) determined by the reference quantizing step calculator 206, and outputs the added result as a quantizing step of the objective block.

In such a way, this embodiment adjusts the shifting direction for each area according to the activity (act) values. Although this embodiment classifies the process into two cases using a threshold value of zero, the number of classified cases may be changed.

Figure 4:
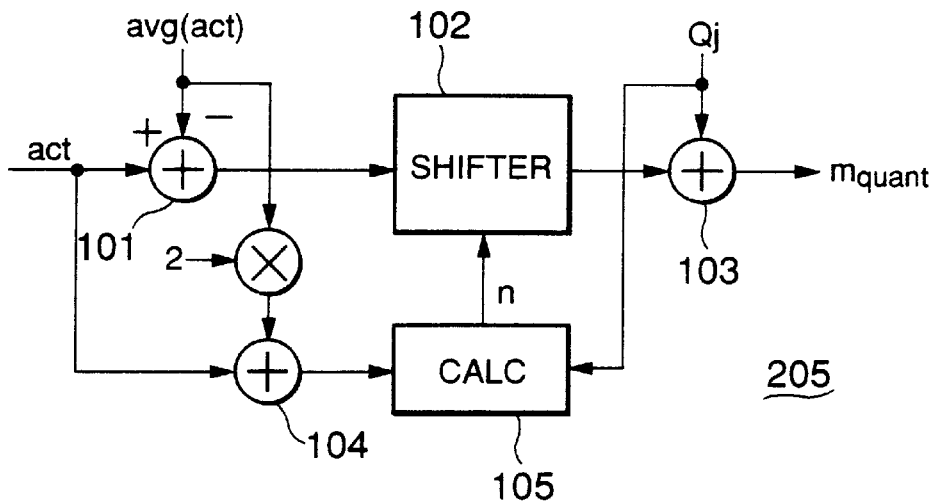
FIG. 4 is a block diagram showing a third embodiment of an adaptive quantization controller of the invention.
Figure 5:
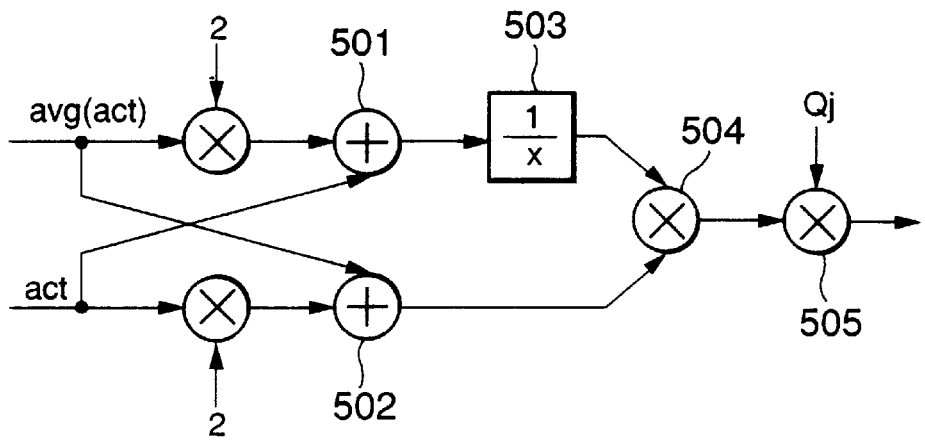
FIG. 5 is a block diagram showing a configuration example of an adaptive quantization controller of the prior art.
Figure 6:
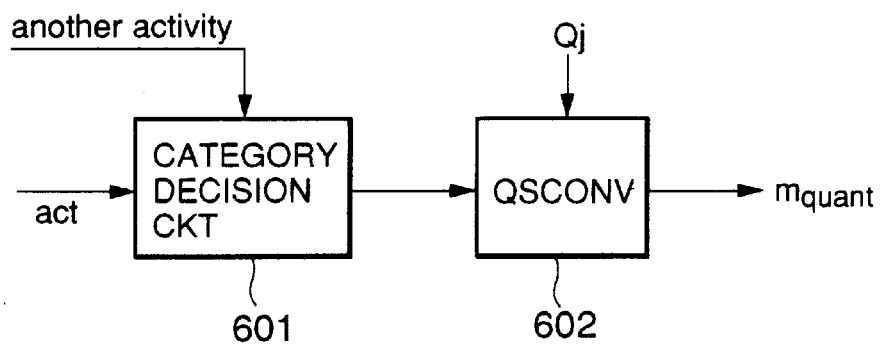
FIG. 6 is a block diagram showing another configuration example of an adaptive quantization controller of the prior art.

FIG. 4 is a block diagram showing a third embodiment of an adaptive quantization controller of the invention. This embodiment determines a shift quantity (n) on the basis of the activity (act) of an objective block and a given reference quantizing step (Qj). The n can be computed by means of the following expression (8);

$$
\begin{aligned}
&n = 1, \text{ if } \{act + 2 \times avg(act)\} < Qj/2, \\
&n = 0, \text{ else,} \\
&\qquad \text{if } \{act + 2 \times avg(act)\} < Qj \times 2, \\
&n = -1, \text{ else.} \qquad (8)
\end{aligned}
$$

The expression (8) substitutes "Qj÷(act+2×avg(act))" which is the second and third factors of the second term of the right side of the expression (3) approximately with a value of the nth power of 2.

In the configuration of FIG. 4, first, an adder 101 computes the difference between the activity (act) of an objective block and the average value of activities (avg(act)) all over the previous frame. An adder 104 adds the activity (act) and twice the average value of activities (act) all over the previous frame to each other. A shift quantity calculator 105 compares the output of the adder 104 respectively with a value of twice a reference quantizing step (2×Qj) and a value of ½ of the reference quantizing step (Qj/2), and determines a shift value (n) as represented by the expression (8). And the shifter 102 shifts the output of the adder 101 by the calculated bits (n). The shifting direction is determined by the sign of n. Finally, the adder 103 adds the output of the shifter 102 to a reference quantizing step (Qj) determined by the reference quantizing step calculator 206, and outputs the added result as a quantizing step of the objective block. Although this embodiment classifies the process into three cases, the number of classified cases may be changed.

As described above, since the present invention realizes by means of a very simple configuration an adaptive quantization controller which can assign a greater code amount to an area where distortion is more easily detected than a code amount to an area where distortion is less remarkable by adaptively changing a quantizing step by using a characteristic value in a divided area of an image and can attain a subjective image quality improvement effect, the invention is useful for making an image coding apparatus small in size.

What is claimed is:

1. An adaptive quantization controller which divides a frame into plural small areas and determines a quantizing step size (q) to be used in a quantization process for each of said divided areas adaptively according to a property of signals in a small area when coding an image by means of a coding process including a quantization process for each of said divided areas, said adaptive quantization controller comprising:

means for measuring a characteristic value (act) in each of said divided areas;

means for computing a difference value between the average value of said characteristic values (avg(act)) in a previous frame and the characteristic value (act) of each of said divided areas;

bit-shifting means for bit-shifting each said difference value by a specified quantity ($|n|$) in a specified direction (sgn(n)); and means for adding said bit-shifted result to a given reference quantizing step (Qj) and outputting the added result as a quantizing step (q) to be used in a quantization process for each of said divided areas.

2. An adaptive quantization controller which divides a frame into plural small areas and determines a quantizing step size (q) to be used in a quantization process for each of said divided areas adaptively according to a property of signals in a small area when coding an image by means of a coding process including a quantization process for each of said divided areas, said adaptive quantization controller comprising:

means for measuring a characteristic value (act) in each of said divided areas;

means for computing a difference value between the average value of said characteristic values (avg(act)) in a previous frame and the characteristic value (act) of each of said divided areas;

bit-shifting means for bit-shifting each said difference value by a specified quantity ($|n|$) in a specified direction (sgn(n)), said bit-shifting means including a setting means for setting a bit-shift value and a shifting direction of each said difference value on the basis of the characteristic value of each of said divided areas or a given reference quantizing step value; and means for adding said bit-shifted result to a given reference quantizing step (Qj) and outputting the added result as a quantizing step (q) to be used in a quantizing process for each of said divided areas.

3. An adaptive quantization controller as defined in claim 2, wherein said setting means computes the sum (S) of twice said characteristic value (act) and the average value (avg (act)) of the characteristic values over all of said frame, and determines the bit-shift value and the shifting direction of each said difference value on the basis of the following expression:

$$
\begin{aligned}
&n = 1 \text{ (if} & &S < Qj/2) \\
&n = 0 \text{ (else, if} & &S < Qj \times 2) \\
&n = -1 \text{ (else).}
\end{aligned}
$$

* * * * *